May 4, 1965

L. PÉRAS 3,181,911

MEANS FOR CONVERTING A TAIL-GATE ESTATE CAR INTO
A LIGHT DELIVERY VAN OR A PASSENGER CAR

Filed Jan. 19, 1963

Inventor
Lucien Peras
By *Stevens, Davis, Miller & Mosher*
Attorneys

May 4, 1965  L. PÉRAS  3,181,911
MEANS FOR CONVERTING A TAIL-GATE ESTATE CAR INTO
A LIGHT DELIVERY VAN OR A PASSENGER CAR
Filed Jan. 19, 1963  4 Sheets-Sheet 2

Inventor
Lucien Peras
By Stevens, Davis, Miller & Mosher
Attorneys

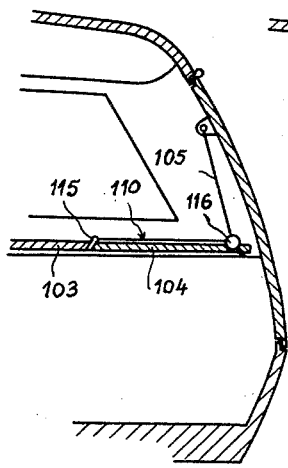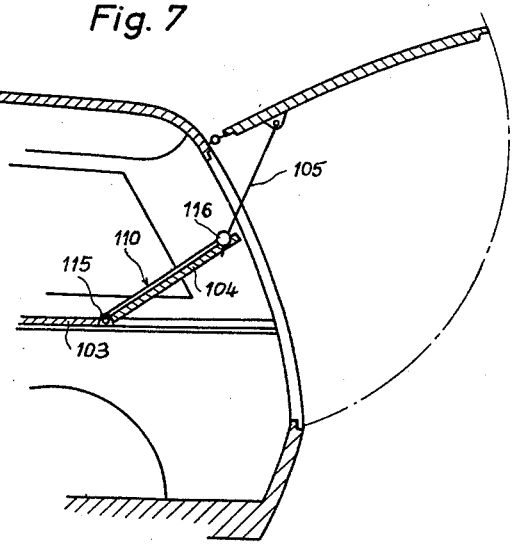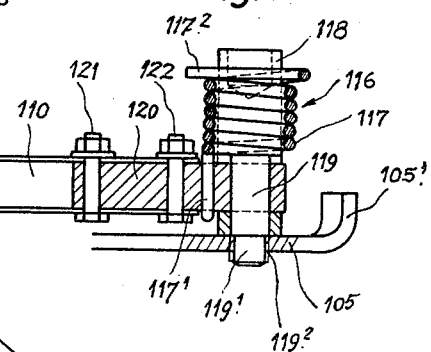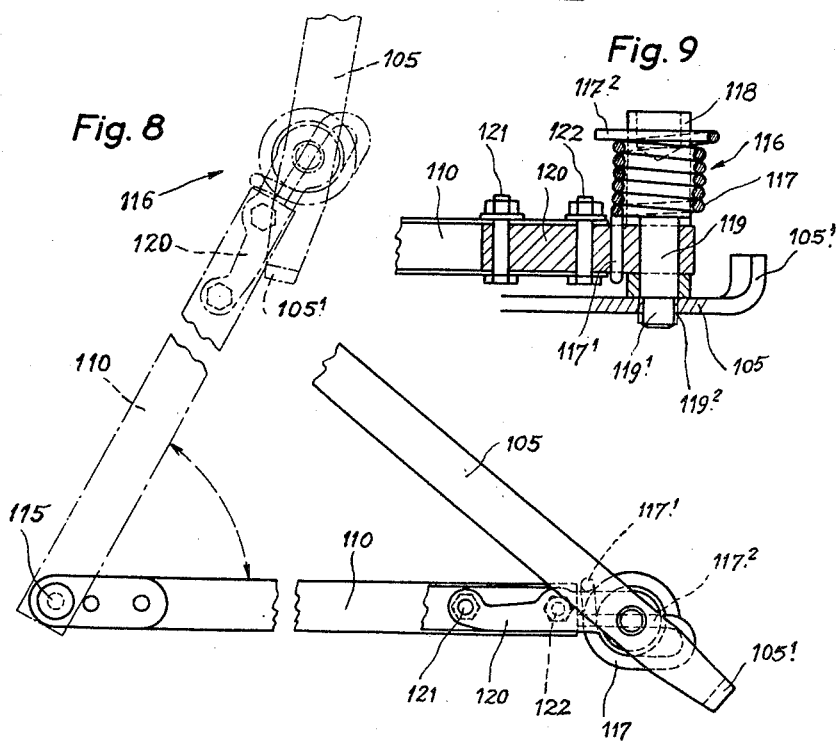

United States Patent Office 3,181,911
Patented May 4, 1965

3,181,911
MEANS FOR CONVERTING A TAIL-GATE ESTATE CAR INTO A LIGHT DELIVERY VAN OR A PASSENGER CAR
Lucien Péras, Billancourt, France, assignor to Regie Nationale des Usines Renault, Billancourt, France
Filed June 19, 1963, Ser. No. 288,984
Claims priority, application France, June 26, 1962, 902,009, Patent 1,334,445
5 Claims. (Cl. 296—37)

This invention relates to automobile vehicles wherein the rear portion has the shape conventional in estate cars having a tail gate, that is, with a roof line continuing to the rear end of the body without the usual shoulder formed by the backlight and boot lid contour.

It is the essential object of this invention to provide an internal arrangement for converting at will the rear portion of vehicles of this character to permit the operation of the vehicle either as a light delivery van or as a passenger car, the conversion from one type to another being effected in a particularly simple and fast manner.

A conversion arrangement according to the present invention comprises essentially a detachable horizontal partition consisting of one or more panel sections which, in the "passenger car" version, extend from the back of the rear seat to the rear end of the vehicle body, so as to constitute at the same time the lid of a lower boot accessible through the tail gate and, at least partially, the floor of an upper boot open to the front.

In the "van" or load carrier version this partition is removed partially or completely so that a considerable loadspace is available in the rear compartment of the vehicle, this loadspace being further increased, if desired, by folding, advancing or even removing the rear seat.

According to a preferred form of embodiment of this invention, the aforesaid partition consists of two panel sections. One section (in the "passenger car" version) is kept in a fixed position against the rear seat back rest and the other section is adapted to pivot upwardly when the tail gate is opened, so that an easier access to the lower boot is obtained.

This lower boot can be closed in a weather-tight manner, this feature being advantageous since the load or luggages placed therein are not visible and the passengers are not likely to be disturbed by their noise or smell.

In order to afford a clearer understanding of this invention, specific forms of embodiment thereof will now be described by way of example with reference to the accompanying drawings, in which:

FIGURE 6 is a vertical section showing the rear portion of an automobile vehicle equipped with a modified embodiment of the arrangement shown in the preceding figures, with the tail gate closed, with tail gate arm balancing spring means;

FIGURE 7 is a sectional view of the same arrangement with the tail gate open;

FIGURE 8 is a side elevational view showing the spring-balanced tail gate arms, and FIGURE 9 is an axial section taken through the intermediate pivot with its balance spring.

Figure 1:
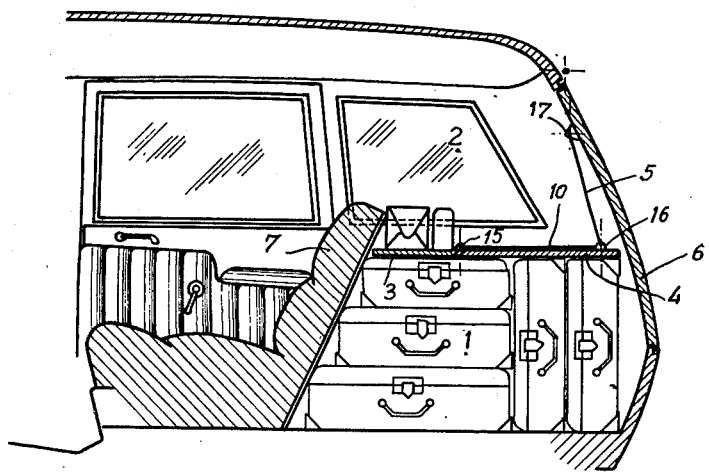
FIGURE 1 is a vertical diagrammatic section showing the rear portion of an automobile vehicle according to a first form of embodiment of the invention, with the tail gate closed and in the "passenger car" version.
Figure 4:
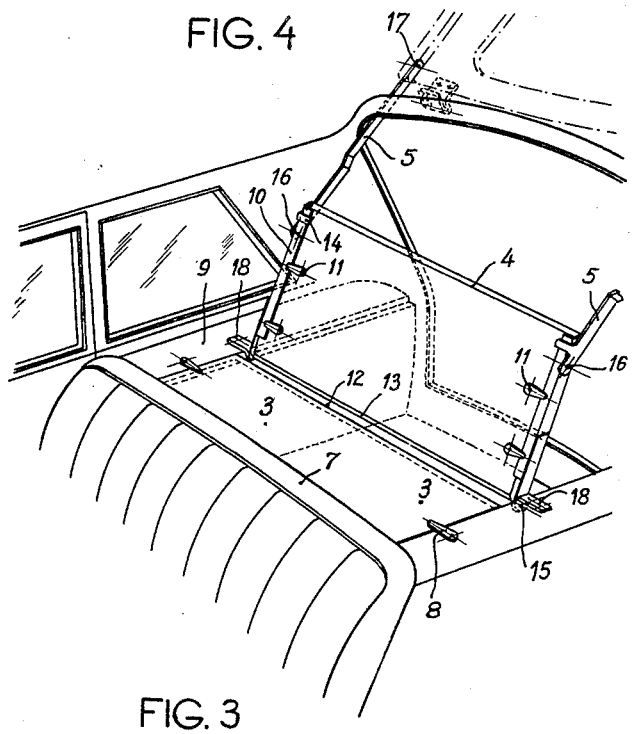
FIGURES 3 and 4 are perspective views showing the inner rear portion of the same vehicle also in the "passenger car" version, according to FIGS. 1 and 2 respectively.

Referring first to FIG. 1, it will be seen that the rear loadspace provided behind the rear seat 7 is divided into two compartments 1, 2 by panel sections 3, 4. An automatic support consisting of twin arms 5, 10 permits of holding the tail gate 6 in its open position $6^1$ by assuming an over-center position (as shown at $5^1$, FIG. 2) and engaging stop members 14 (FIG. 4). This twin-arm automatic support arrangement comprises arms 5, 10 pivotally interconnected at 16, the arms 5 being further pivoted at 17 on the tail gate and at 15, 18 on side shelves or boards 9 extending along the inner side wall of the vehicle body. The panel section 3 remains fixed during the opening of the tail gate, but it is detachably mounted. To this end it is held in position by pivoting lugs 8 (or locks, slideways or any other adequate devices permitting of rapidly locking and releasing this section).

The other panel section 4 is secured on the twin arms 10 of the automatic support by means of lugs 11 (or any other suitable devices); under these conditions, the hinged panel section 4 is movable bodily with the arms 10 of the automatic support during the tail gate opening movement.

The edges 12 and 13 of panel sections 3, 4 may be designed to overlap each other and to provide a joint of adequate tightness therebetween. This joint being further improved by fitting resilient gaskets therealong and also along the peripheral contour of the aperture formed between the rear-seat back rest, the tail gate and the fixed side shelves or like portions of the vehicle body.

Figure 2:
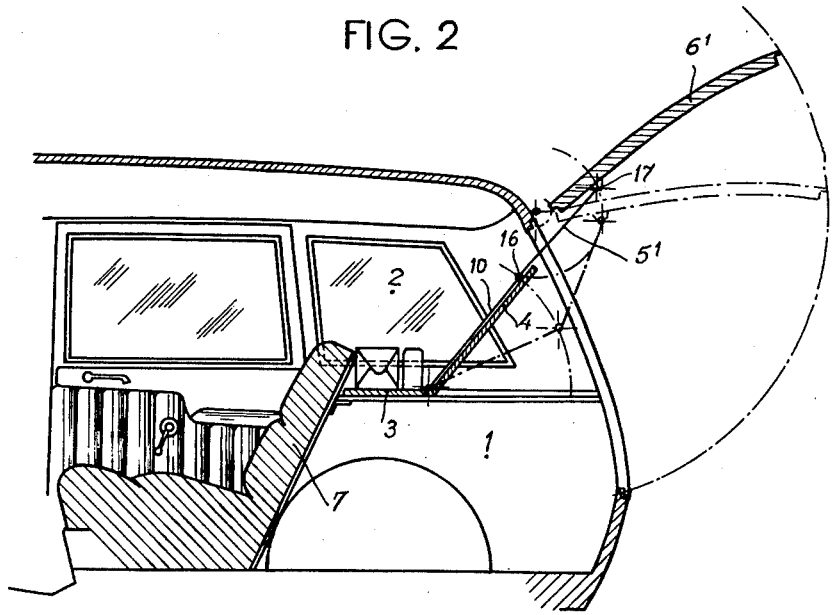
FIGURE 2 is a section similar to FIG. 1 but with the tail gate open.
Figure 3:
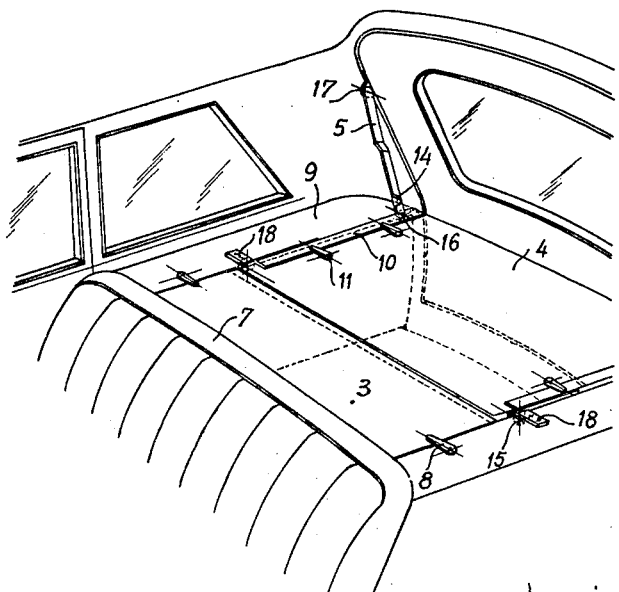

To convert the vehicle into the "passenger car" version the two panel sections 3, 4 are kept in position by the lugs or locks 8, 11 (FIGS. 3 and 4). When the tail gate 6 is opened, the rear panel section 4 is raised by the arms 10 of the automatic support, and thus luggages or other loads can be introduced into the boot 1 (see FIGS. 2 and 4). When the user re-closes the tail gate 6, the boot 1 is completely isolated from the passengers' compartment. The passengers can also place small objects on the front panel section 3 without interfering with the opening of the lid-forming rear section 4 since panel section 3 remains stationary during the tail gate opening movement. A small detachable rack (not shown) may be fitted between the side shelves 9 of the vehicle body to separate the panel sections 3, 4 from each other and thus prevent the objects placed on the front panel section 3 from sliding toward the rear panel section 4 and thus interfere with the opening of the tail gate and of the boot 1. It will be seen that the rear visibility is not impaired and that the boot 1 is used like any conventional boots of passenger cars.

In the "van" version (FIG. 5) the two panel sections 3, 4 are removed (but if desired only panel section 4 may be removed, as shown), together with the rack separating the two panel sections 3, 4, if any is provided, these sections being laid if desired on the floor of the lower boot 1. Thus the upper and lower boots 2, 1 are merged into one and constitute a considerable load-space for transporting relatively bulky objects.

In order further to increase this load-space in the rear compartment the rear seat 7 may be advanced in the known manner against the front seat, or folded up or even removed to gain more space.

Figure 5:
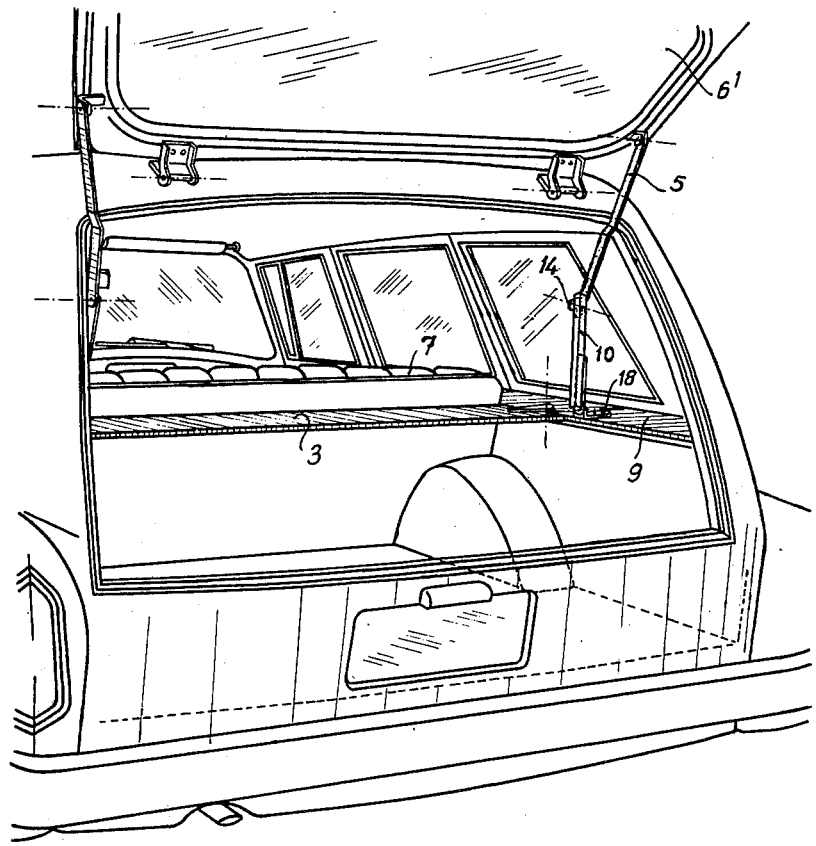
FIGURE 5 is a perspective view showing the rear portion of the same vehicle with the tail gate open, but in the "van" version.

It will be noted that in the above-described form of embodiment of the invention the tail gate is held in the open position by the automatic support, provided that the twin arms thereof attain their overcenter position (see FIGS. 2, 4 and 5).

To close the tail gate, the twin arms 5, 10 of the automatic support must be acted upon. Now in the case of the preceding form of embodiment this is not always easy, if the rear panel section 4 is not fitted, unless a cross member interconnects the two sets of twin arms.

However, this cross member would obviously restrict the space available in the rear compartment of the vehicle and make the access thereto more difficult.

To avoid this drawback, there is provided, in a modified form of embodiment of this invention (see FIGS. 6 and 7) a spring-loaded balancing device wherein spring means 116 complete the pivotal mounting of the twin arms 105, 110 of the tail gate support.

In this modified embodiment, which incorporates on the other hand all the component elements of the preceding form of embodiment, notably the panel sections 103, 104, it is not necessary to attain an overcenter position since the tail gate is balanced.

The balancing system may consist of any known and suitable system.

However, according to a preferred form of embodiment of this invention, this device incorporates the balanced hinge means described in the U.S. Patent Ser. No. 183,624 of March 29, 1962, and entitled "Improvements in or Relating to Automobile Bonnet Hinges," which is characterized mainly by the use of torsion-stressed coil springs.

This hinge device is illustrated in detail in FIGS. 8 and 9 of the drawings.

In these figures it will be seen that the pivot pin 119 of this hinge device is carried by a bracket 120 secured in turn on the arm 110 of the gate support by means of bolts 121, 122.

This hinge pin 119 has an end portion $119^1$ splined at $119^2$ and force fitted in a correspondingly shaped orifice of arm 105.

The other end of pin 119 has a socket-like extension 118 having threaded thereon a coil spring 117, one end $117^1$ of this spring bearing against the bracket 120, the other end $117^2$ being bent toward its center and extending through a pair of diametrally opposite holes formed in the socket-like extension 118.

Thus, the coil spring 117 reacts against the arm 110 of the tail gate support and applies to the pivot pin 119 a torque transmitted to the other arm 105 through the splined portion $119^1$, this torque being exerted in the direction to divaricate the arms 105, 110.

The movement of this hinge device is shown in FIG. 8, in which the device is shown in thick lines in its closed position and in chain-dotted lines in its open position.

To prevent the twin-arm support 105, 110 from attaining a straight or aligned position (dead center) during its opening movement, one portion $105^1$ of arm 105 is bent at right angles and acts as a limit stop by engaging the other arm 110, as shown.

With this modified form of embodiment it is clear that when it is desired to close the tail gate from its wide-open position it is not necessary to act upon the arms of the gate support. Therefore, a cross member interconnecting these arms may be dispensed with and a greater loadspace is available.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:
1. In an automobile having at least one seat and a tailgate and a rear compartment behind the rearmost seat, partition means extending substantially horizontally between said rearmost seat and said gate and dividing said compartment into a lower and an upper chamber, means detachably securing said partition means in said dividing position, said partition means being formed of a first and a second panel, link means connected between said tailgate and said second panel and being provided to pivot said second panel in an upward direction with respect to said first panel when said tailgate is opened.

2. In an automobile having at least one seat and a tailgate and a rear compartment behind the rearmost seat, a first and a second panel, lateral shelves, said shelves extending along the longitudinal compartment side walls between said rearmost seat and said tailgate and having a first portion adapted to support said first panel, means to secure said first panel adjacent to said rearmost seat detachably to said side shelves, supporting means to fasten said second panel pivotally about an axis coinciding substantially with the edge of said first panel which is remote from said rearmost seat and parallel thereto, said supporting means being adapted to rest on a second portion of said shelves, means to fasten said second panel detachably to said supporting means, means to link said supporting means to said tailgate, said linking means adapted to lift said second panel from its normal position and pivot it about said pivoting axis when said tailgate is opened and to return said second panel to its normal position when said tailgate is closed.

3. In an automobile having at least one seat and a tailgate and a rear compartment behind the rearmost seat, a first and a second panel, lateral shelves, said shelves extending along the longitudinal compartment side walls between said rear seat and said tailgate and having a first and a second portion, said first portion being adapted to receive said first panel, means to secure said first panel adjacent to said rearmost seat detachably to said side shelves, lateral arms extending in the longitudinal direction of said automobile, one end of each of said arms being mounted pivotally about an axis coinciding substantially with the transverse edge of said first panel remote from said seat, said arms being adapted to support said second panel in the area of its longitudinal edges, means to secure said second panel detachably to said arms, said arms being adapted to rest on said second portion of said shelves, connecting rods, one end of each of said connecting rods being articulated to said other ends of each of said arms, the other ends of said connecting rods being articulated to said tailgate, said connecting rods being adapted to lift said second panel from its normal position and to pivot it about said pivotal axis when said tailgate is opened, and to return said second panel to its normal position when said tailgate is closed.

4. In an automobile having at least one seat and a tailgate and a rear compartment behind the rearmost seat, the structure of claim 3, wherein the other ends of said first arms project beyond the point where said arms are articulated to said connecting rods and wherein said connecting rods at their ends adjacent said arms are provided with stop members, said stop members adapted to engage said projecting ends when said tailgate is in its opened position and said arms and said connecting rods are beyond their over-center position.

5. In an automobile having at least one seat and a tailgate and a rear compartment behind the rearmost seat, the structure of claim 3 comprising furthermore resilient means to hold said tailgate in its open position and means to limit the opening movement of said gate before straight alignment of said arms and said connection rods is reached.

References Cited by the Examiner

UNITED STATES PATENTS 2,889,097  6/59  Broehl _____ 296—23 X

FOREIGN PATENTS 1,096,280  6/55  France.

A. HARRY LEVY, *Primary Examiner.*